US012565978B2

(12) United States Patent
Wu

(10) Patent No.: US 12,565,978 B2
(45) Date of Patent: Mar. 3, 2026

(54) DYNAMIC VEHICLE HEADLAMP SYSTEM

(71) Applicant: COPLUS INC., Tainan City (TW)

(72) Inventor: Po-Hua Wu, Tainan City (TW)

(73) Assignee: COPLUS INC., Tainan City (TW)

( * ) Notice: Subject to any disclaimer, the term of this patent is extended or adjusted under 35 U.S.C. 154(b) by 0 days.

(21) Appl. No.: 19/051,380

(22) Filed: Feb. 12, 2025

(65) Prior Publication Data

US 2025/0320979 A1 Oct. 16, 2025

(30) Foreign Application Priority Data

Apr. 16, 2024 (TW) .................................. 113114191

(51) Int. Cl.
| | |
|---|---|
| *F21S 43/20* | (2018.01) |
| *B60Q 1/00* | (2006.01) |
| *B60Q 1/14* | (2006.01) |
| *F21V 23/00* | (2015.01) |

(52) U.S. Cl.
CPC .......... *F21S 43/265* (2024.05); *B60Q 1/0017* (2013.01); *B60Q 1/1415* (2013.01); *F21V 23/003* (2013.01)

(58) Field of Classification Search
CPC ... F21S 43/265; B60Q 1/0017; B60Q 1/1415; F21V 23/003
See application file for complete search history.

(56) References Cited

U.S. PATENT DOCUMENTS

| | | | | |
|---|---|---|---|---|
| 7,095,318 | B1 * | 8/2006 | Bekhor ................... | B60Q 1/503 |
| | | | | 340/464 |
| 11,643,007 | B2 * | 5/2023 | Matha ...................... | B60Q 1/18 |
| | | | | 362/459 |
| 11,651,713 | B2 * | 5/2023 | Kim ........................ | B60K 35/22 |
| | | | | 345/84 |
| 2015/0138807 | A1 * | 5/2015 | Salter ..................... | F21S 41/16 |
| | | | | 362/543 |
| 2018/0186277 | A1 * | 7/2018 | Glickman ............... | B60R 19/52 |
| 2021/0261045 | A1 * | 8/2021 | Cha ........................ | B60W 60/00 |
| 2024/0191859 | A1 * | 6/2024 | Kim ........................ | F21S 43/15 |

* cited by examiner

*Primary Examiner* — Bryon T Gyllstrom
(74) *Attorney, Agent, or Firm* — MUNCY, GEISSLER, OLDS & LOWE, P.C.

(57) ABSTRACT

A dynamic vehicle headlamp system is adapted to be mounted to a vehicle and be signally connected to an electronic control unit (ECU) of the vehicle. The dynamic vehicle headlamp system includes a first headlamp module, a second headlamp module, a grille light module, and a control module. The first headlamp module includes a first decorative light unit, and the second headlamp module includes a second decorative light unit. The control module is signally connected to the first headlamp module, the second headlamp module and the grille light module, and is adapted to be signally connected to the ECU. The control module is configured to be actuated by a light control signal transmitted from the ECU to control the first decorative light unit, the second decorative light unit and the grille light unit (51) to function in a predetermined lighting mode.

10 Claims, 6 Drawing Sheets

DYNAMIC VEHICLE HEADLAMP SYSTEM

CROSS-REFERENCE TO RELATED APPLICATION

This application claims priority to Taiwanese Invention Patent Application No. 113114191, filed on Apr. 16, 2024, the entire disclosure of which is incorporated by reference herein.

FIELD

The disclosure relates to a vehicle light system, and more particularly to a dynamic vehicle headlamp system mounted to a vehicle head and a grille of a vehicle.

BACKGROUND

In order to make a vehicle have a techy and futuristic visual effect for drawing attention of consumers, in addition to innovative improvement on a vehicle body design and an interior of the vehicle, an innovation for a vehicle headlamp system of the vehicle is also crucial. Many manufacturers may install a plurality of decorative lights in left and right headlamp devices of the vehicle headlamp system, and when the vehicle is controlled to be unlocked or locked, an electronic control unit (ECU) of the vehicle can simultaneously control the decorative lights in the left and right headlamp devices to cooperatively emit light in a predetermined mode, thereby exhibiting a dynamic lighting effect.

Since the headlamp devices are normally installed on left and right corners of a vehicle head of the vehicle, the dynamic lighting effect can only present on a portion of each of the left and right corners of the vehicle head; thus, the generated dynamic lighting visual effect may be unnoticeable.

SUMMARY

Therefore, an object of the disclosure is to provide a dynamic vehicle headlamp system that can alleviate at least one of the drawbacks of the prior art.

According to the disclosure, the dynamic vehicle headlamp system is adapted to be mounted to a vehicle head and a grille of a vehicle, and is adapted to be signally connected to an electronic control unit (ECU) of the vehicle. The dynamic vehicle headlamp system includes a first headlamp module, a second headlamp module, a grille light module and a control module. The first headlamp module and the second headlamp module are adapted to be mounted to the vehicle head and spaced apart from each other in a left-right direction. The first headlamp module includes a first decorative light unit, and the second headlamp module includes a second decorative light unit. The grille light module includes a grille light unit that is adapted to be disposed on the grille of the vehicle. The control module is signally connected to the first headlamp module, the second headlamp module, the grille light module, and is adapted to be signally connected to the ECU. The control module is configured to be actuated by a light control signal transmitted from the ECU to control the first decorative light unit, the second decorative light unit and the grille light unit to function in a predetermined lighting mode.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
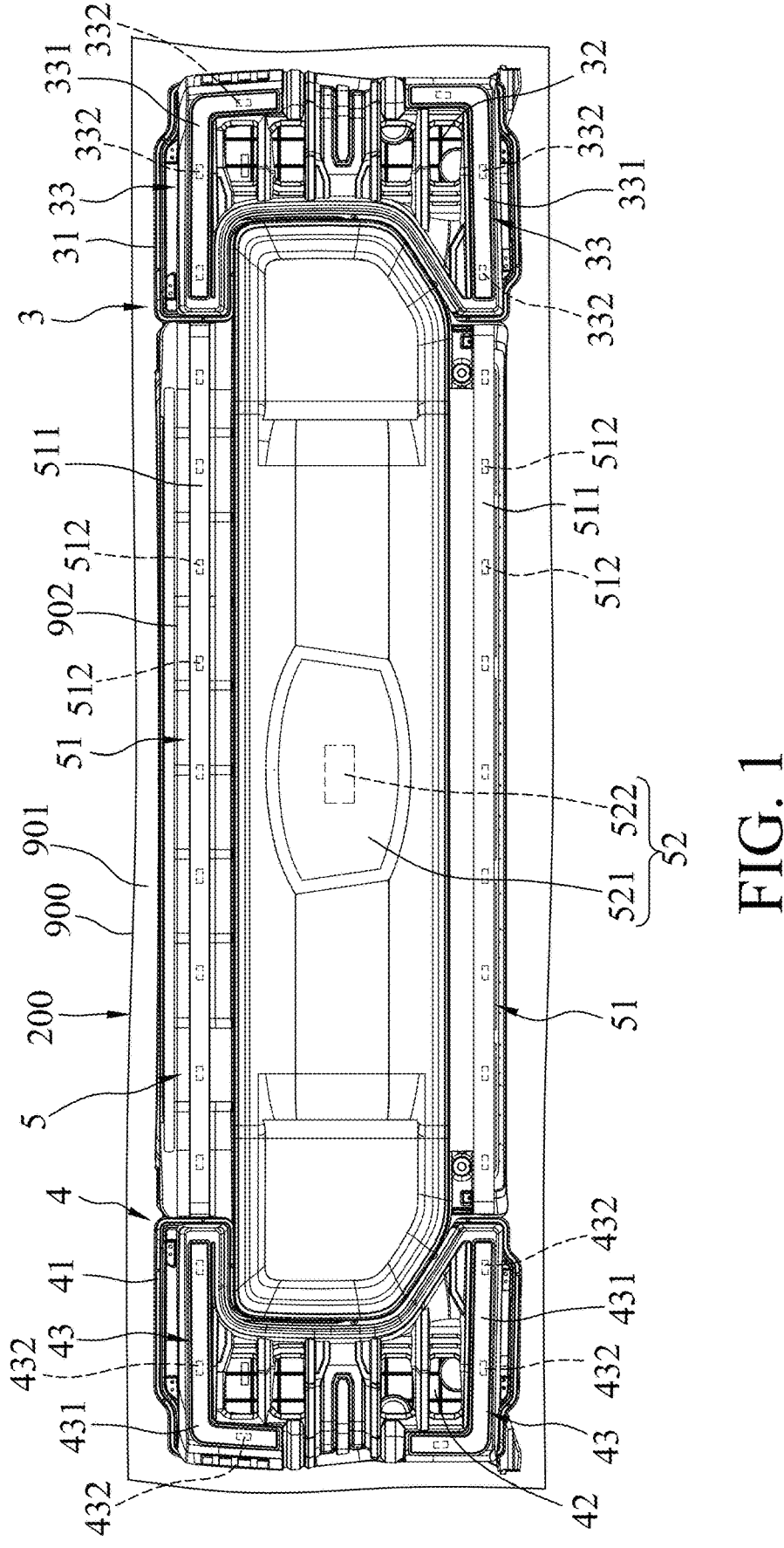
FIG. 1 is a fragmentary front view illustrating a first embodiment of a dynamic vehicle headlamp system according to the disclosure being mounted to a vehicle head and a grille of a vehicle.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
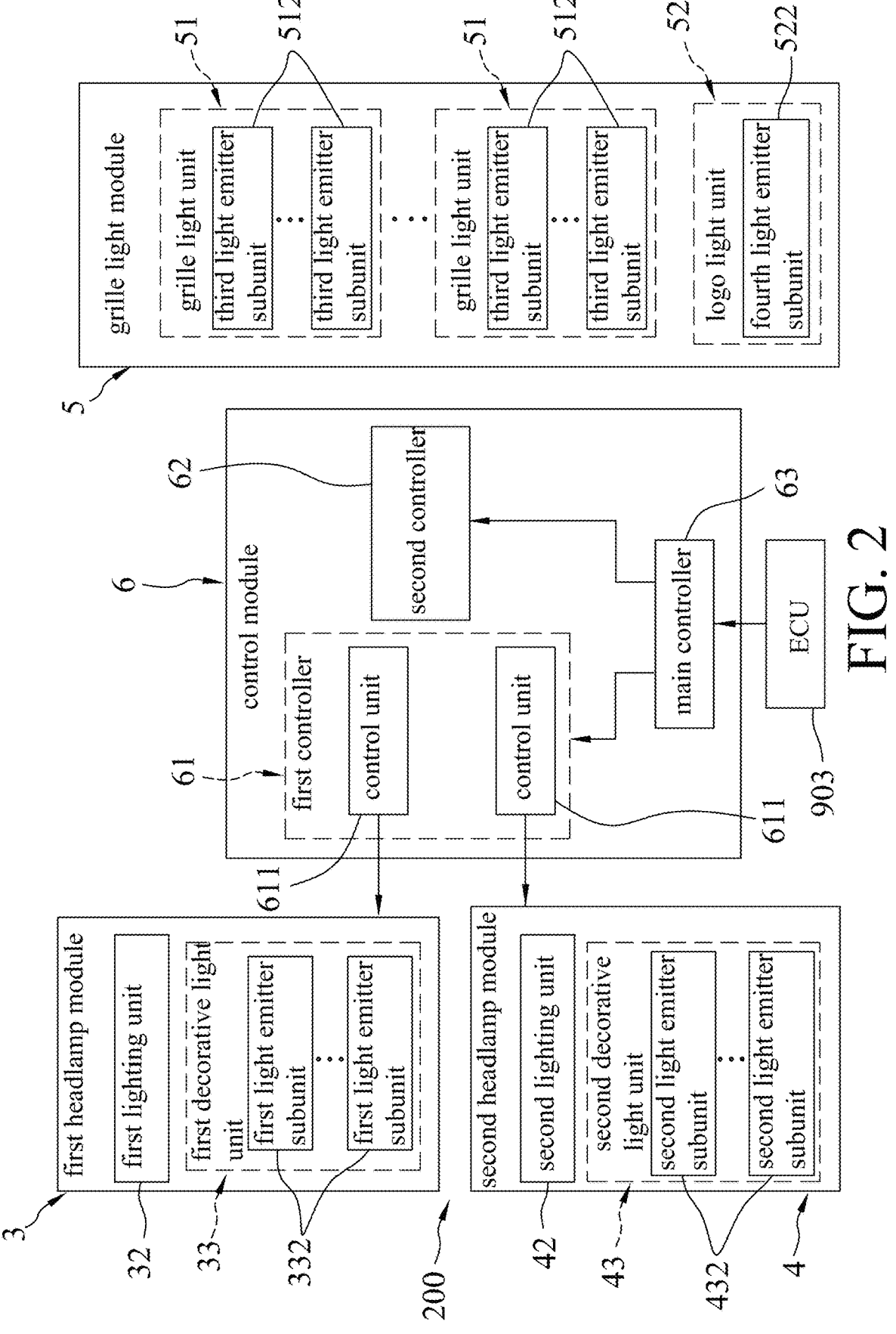
FIG. 2 is a block diagram illustrating the first embodiment.

Referring to FIGS. 1 and 2, a first embodiment of a dynamic vehicle headlamp system 200 according to the present disclosure is adapted to be mounted to a vehicle 900. The vehicle 900 includes a vehicle head 901, a grille 902 provided on a front side of the vehicle head 901, and an electronic control unit (ECU) 903. The dynamic vehicle headlamp system 200 includes a first headlamp module 3 and a second headlamp module 4 that are mounted to the vehicle head 901 and that are spaced apart from each other in a left-right direction, a grille light module 5 that is disposed on a front side of the grille 902, and a control module 6 that is disposed on the vehicle 900, that is signally connected to the first headlamp module 3, the second headlamp module 4 and the grille light module 5, and that is adapted to be signally connected to the ECU 903.

The first headlamp module 3 includes a lamp housing 31, and a first lighting unit 32 and a plurality of first decorative light units 33 that are disposed in the lamp housing 31. The second headlamp module 4 includes a lamp housing 41, and a second lighting unit 42 and a plurality of second decorative light units 43 that are disposed in the lamp housing 41.

The first and second lighting units 32, 42 are configured to be controlled by the control module 6 to emit light, thereby cooperatively forming a beam pattern of a high beam and/or a beam pattern of a low beam.

Since the lamp housings 31, 41 may have various aspects for different types of vehicles, the first and second lighting units 32, 42 that are used for generating a beam pattern of a high beam and/or a beam pattern of a low beam may also have various aspects; however, the above-mentioned are not the focus of this disclosure, details of which are omitted herein for the sake of brevity. In practice, appearances of the lamp housings 31, 41 and the first and second lighting units 32, 42 are not limited to those illustrated in the drawings.

The first decorative light units 33 of the first headlamp module 3 substantially extend along a periphery of the lamp housing 31 into a specific shape, and are disposed around the first lighting unit 32. Each of the first decorative light units 33 has a first light strip 331 that is elongated and light-transmissible, and a plurality of first light emitter subunits 332 that are disposed in the first light strip 331, that are spaced apart from each other along an extending direction of the first light strip 331, and that are configured to be controlled by the control module 6 to emit light. The first light emitter subunits 332 may be, but are not limited to, light-emitting diodes (LEDs). For each of the first decorative light units 33, the first light strip 331 is made of a light-guiding material, such as an acrylic polymer, but is not limited to such; accordingly, light that is emitted from the first light emitter subunits 332 may go through the first light strip 331 outwardly and be guided along the first light strip 331.

A structure of the second headlamp module 4 is a horizontally inverted structure of the first headlamp module 3, details of which will not be repeated in the following. Each of the second decorative light units 43 includes a second light strip 431 that is elongated and light-transmissible, and a plurality of second light emitter subunits 432 that are disposed in the second light strip 431, that are spaced apart from each other along an extending direction of the second light strip 431, and that are configured to be controlled by the control module 6 to emit light. The second light emitter subunits 432 may be, but are not limited to, LEDs. For each of the second decorative light units 43, the second light strip 431 is made of a light-guiding material, such as an acrylic polymer, but is not limited to such; accordingly, light that is emitted from the second light emitter subunits 432 may go through the second light strip 431 outwardly and be guided along the second light strip 431.

The grille light module 5 includes a plurality of grille light units 51 and a logo light unit 52 that are spaced apart from each other and that are disposed on the front side of the grille 902. In this embodiment, there are two grille light units 51, and the grille light units 51 extend in the left-right direction and are spaced apart from each other in a top-bottom direction. The logo light unit 52 is located between the grille light units 51 in the top-bottom direction. However, in implementation, a number and a configuration of the grille light units 51 are not limited to what is disclosed herein.

Each of the grille light units 51 includes a grille light strip or third light strip 511 that is light-transmissible and that is elongated in the left-right direction, and a plurality of grille light emitter subunits or third light emitter subunits 512 that are disposed in the third light strip 511, that are spaced apart from each other along an extending direction of the third light strip 511, and that are configured to be controlled by the control module 6 to emit light.

The third light emitter subunits 512 may be, but are not limited to, LEDs. For each of the grille light units 51, the third light strip 511 is made of a light-guiding material, such as an acrylic polymer, but is not limited to such; accordingly, light that is emitted from the third light emitter subunits 512 may go through the third light strip 511 outwardly and be guided along the third light strip 511.

The logo light unit 52 includes a logo holder 521 that is for disposing a logo and that is light transmissible, and a logo light emitter subunit or fourth light emitter subunit 522 that is disposed in the logo holder 521. The fourth light emitter subunit 522 may be, but is not limited to, an LED, and may be controlled by the control module 6 to emit light. The logo holder 521 is made of a light-guiding material, such as an acrylic polymer, but is not limited to such; accordingly, light that is emitted from the fourth light emitter subunit 522 may go through the logo holder 521 outwardly and be guided along the logo holder 521.

The control module 6 includes a first controller 61 that is signally connected to the first headlamp module 3 and the second headlamp module 4, a second controller 62 that is signally connected to the grille light module 5, and a main controller 63 that is signally connected to the first controller 61 and the second controller 62 and that is adapted to be signally connected to the ECU 903.

The first controller 61 includes two control units 611 that are respectively and signally connected to the first headlamp module 3 and the second headlamp module 4. Each of the control units 611 is configured to control light emission timing of the first light emitter subunits 332 of the respective first headlamp module 3 or light emission timing of the second light emitter subunits 432 of the respective second headlamp module 4, such as time points at which the first light emitter subunits 332 or the second light emitter subunits 432 are turned on (i.e., start emitting light) and are turned off, time periods for which the first light emitter subunits 332 or the second light emitter subunits 432 switch from a turned-on state to a turned-off state and from the turned-off state to the turned-on state, etc., but is not limited to such.

The second controller 62 is configured to control light emission timing of the third light emitter subunits 512 and the fourth light emitter subunit 522, such as time points at which the third light emitter subunits 512 and the fourth light emitter subunit 522 are turned on (i.e., start emitting light) and are turned off, time periods for which the third light emitter subunits 512 and the fourth light emitter subunit 522 switch from a turned-on state to a turned-off state and from the turned-off state to the turned-on state, etc., but is not limited to such.

The control module 6 is configured to be actuated by a light control signal transmitted from the ECU 903 to control the first decorative light units 33, the second decorative light units 43 and the grille light units 51 to function in a predetermined lighting mode; specifically, the main controller 63 is configured to be triggered by a light control signal transmitted from the ECU 903, to thereby drive the control units 611 of the first controller 61 to control the light emission timing of the first light emitter subunits 332 and the second light emitter subunits 432, and to thereby drive the second controller 62 to control the light emission timing of the third light emitter subunits 512 and the fourth light emitter subunit 522, so that the first light emitter subunits 332, the second light emitter subunits 432, the third light emitter subunits 512 and the fourth light emitter subunit 522 cooperate to function in the predetermined lighting mode based on the light control signal.

In practice, the control module 6 may realize the function of controlling the light emission timing of the first light emitter subunits 332, the second light emitter subunits 432, the third light emitter subunits 512 and the fourth light emitter subunit 522 through circuit design such as logic circuits, multiplexers, etc.; however, the functions and configuration of the control module 6 are not limited to the abovementioned.

Figure 3:
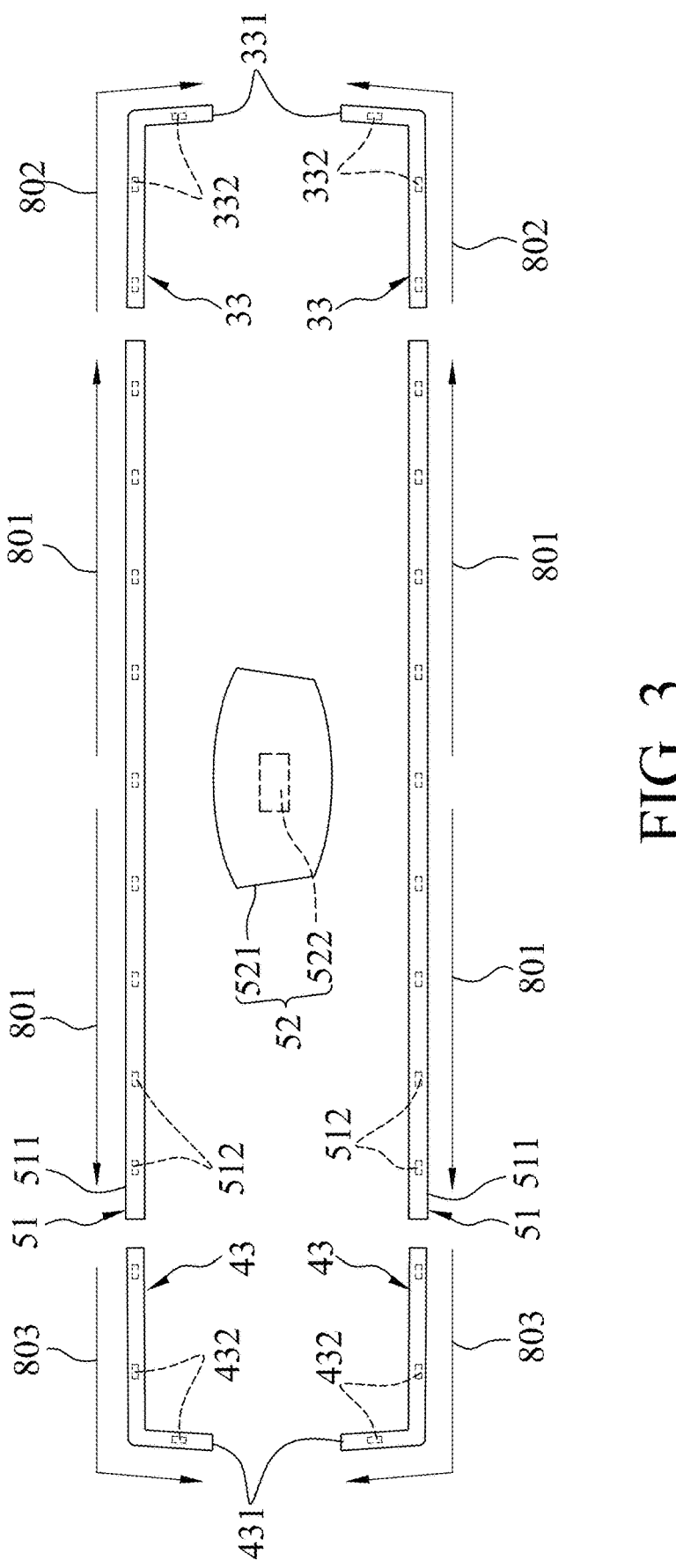
FIG. 3 is schematic view illustrating light emission timing of a plurality of first light emitter subunits, a plurality of second light emitter subunits and a plurality of third light emitter subunits of the first embodiment.

Referring to FIGS. 1 to 3, the predetermined lighting mode, where the first light emitter subunits 332, the second light emitter subunits 432, the third light emitter subunits 512 and the fourth light emitter subunit 522 cooperate to emit light, is exemplified. For convenience of description, the third light emitter subunits 512 are divided into two groups in the left-right direction with a center of the grille 902 serving as the boundary.

When the vehicle 900 is controlled to be unlocked or locked, the ECU 903 activates a vehicle headlamp exhibition function, and sends a light control signal to the main controller 63. The main controller 63 is triggered by the light control signal, to thereby drive the control units 611 of the first controller 61 and the second controller 62.

The second controller 62 first controls the fourth light emitter subunit 522 to emit light, thus lighting up the logo holder 521, then controls the groups of the third light emitter subunits 512 to respectively emit light from the center of the grille 902 towards the left and the right, and controls the groups of the third light emitter subunits 512 to respectively turn off from the center of the grille 902 towards the left and the right as shown by arrows 801. Specifically, in each group of the third light emitter subunits 512, the third light emitter subunits 512 are sequentially turned on in a direction from the center of the grille 902 towards the left/right, and are sequentially turned off towards the left/right. Through such configuration, the groups of the third light emitter subunits 512 cooperate to generate four flows of light, and in each group, the flows of light are spaced apart from each other in the top-bottom direction and flow towards the left/the right. When controlling the third light emitter subunits 512 to emit light, the second controller 62 also controls the fourth light emitter subunit 522 to turn off.

Next, when the second controller 62 controls the third light emitter subunits 512 located the leftmost and the rightmost to switch from the turned-on state to the turned-off state, the control units 611 control the first light emitter subunits 332 and the second light emitter subunits 432 to emit light. One of the control units 611 that is signally connected to the first headlamp module 3 controls the first light emitter subunits 332 to sequentially start emitting light in a direction away from the grille light units 51, and to sequentially turn off in the direction away from the grille light units 51, as shown by arrows 802. The other one of the control units 611 that is signally connected to the second headlamp module 4 controls the second light emitter subunits 432 to sequentially start emitting light in a direction away from the grille light units 51, and to sequentially turn off in the direction away from the grille light units 51, as shown by arrows 803. Through such configuration, the first decorative light units 33 and the second decorative light units 43 cooperate to generate four flows of light that are spaced apart from each other in the top-bottom direction and the left-right direction; specifically, the two flows of light generated by the first decorative light units 33 flow in a direction opposite to a direction where the two flows of light generated by the second decorative light units 43 flow.

At this time, the first headlamp module 3, the second headlamp module 4 and the grille light module 5 have cooperatively exhibited the dynamic vehicle headlamp effect, which presents when the vehicle 900 is locked or unlocked.

Since the dynamic vehicle headlamp system 200 includes the grille light units 51 and the logo light unit 52 that are disposed on the grille 902, and the first headlamp module 3 and the second headlamp module 4 that are located respectively at left and right sides of the grille 902, the dynamic vehicle headlamp effect generated thereby may present on the entire front side area of the vehicle head 901 of the vehicle 900, which significantly enlarges an area where the dynamic vehicle headlamp effect presents and thus attracts consumers and the crowd more easily.

Since various types of dynamic vehicle headlamp effects can be generated by the first decorative light units 33, the second decorative light units 43, the grille light units 51 and the logo light unit 52, the dynamic vehicle headlamp effect generated by the dynamic vehicle headlamp system 200 is not limited to the abovementioned implementation.

In addition, in other embodiments of the disclosure, numbers of the first decorative light units 33, the second decorative light units 43, the grille light units 51 and the logo light unit 52 each may be increased or decreased according to actual needs, and are not limited to the abovementioned implementation.

Figure 4:
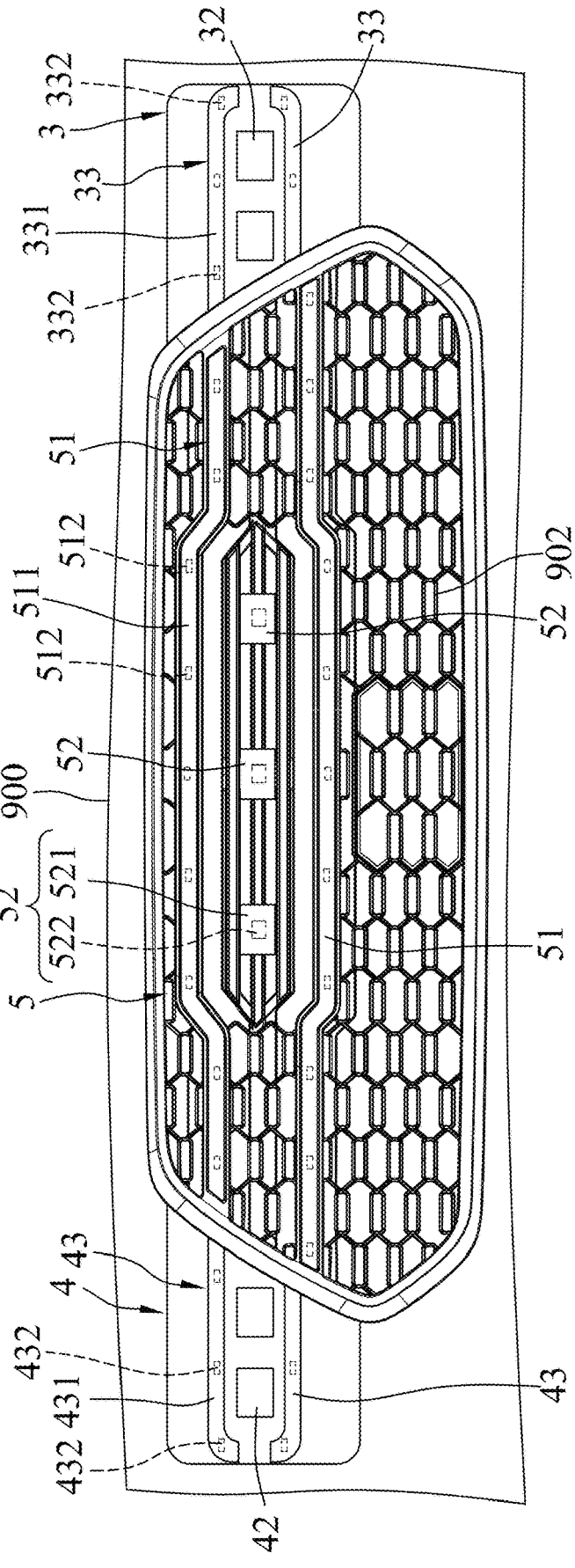
FIG. 4 is a fragmentary front view illustrating a variation of the first embodiment.

Referring to FIGS. 1 and 4, a variation of the first embodiment is provided. The dynamic vehicle headlamp system 200 of the present disclosure may be mounted to various types of vehicles; thus, in practice, the appearance of the dynamic vehicle headlamp system 200 may vary to fit vehicle heads and grilles of various types of vehicles; for example, there may be a plurality of logo light units 52; in other words, the dynamic vehicle headlamp system 200 is not limited to those illustrated in the drawings.

Figure 5:
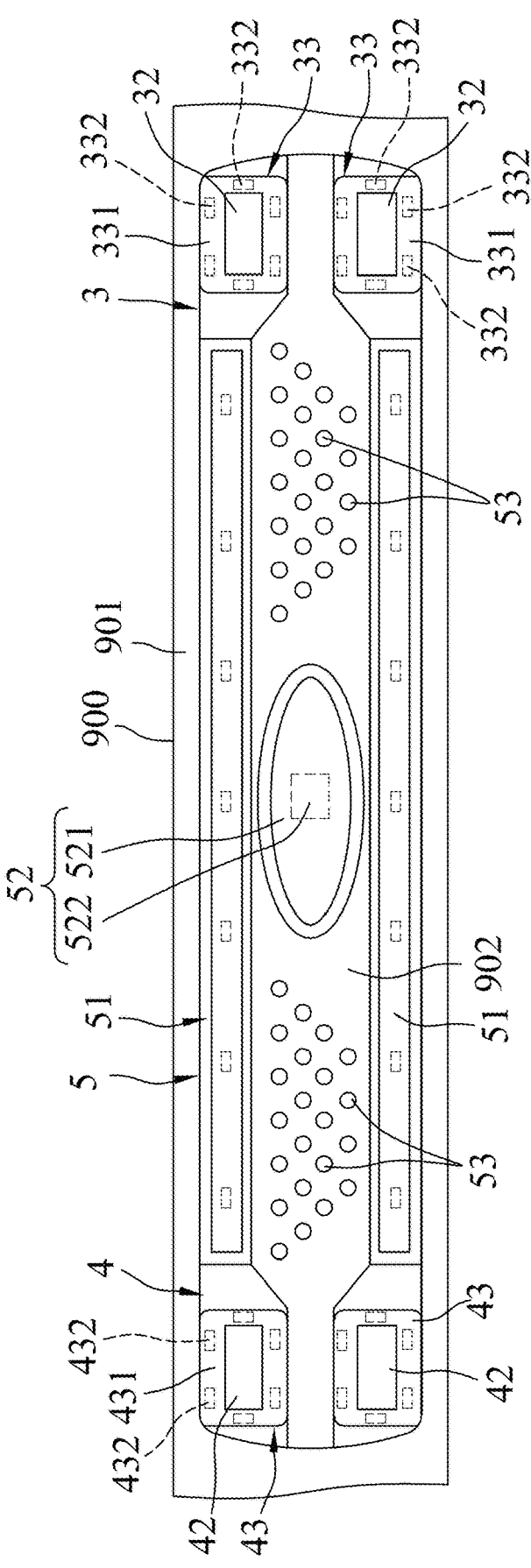
FIG. 5 is a fragmentary front view illustrating a second embodiment of the dynamic vehicle headlamp system according to the disclosure being mounted to the vehicle head and the grille of the vehicle.
Figure 6:
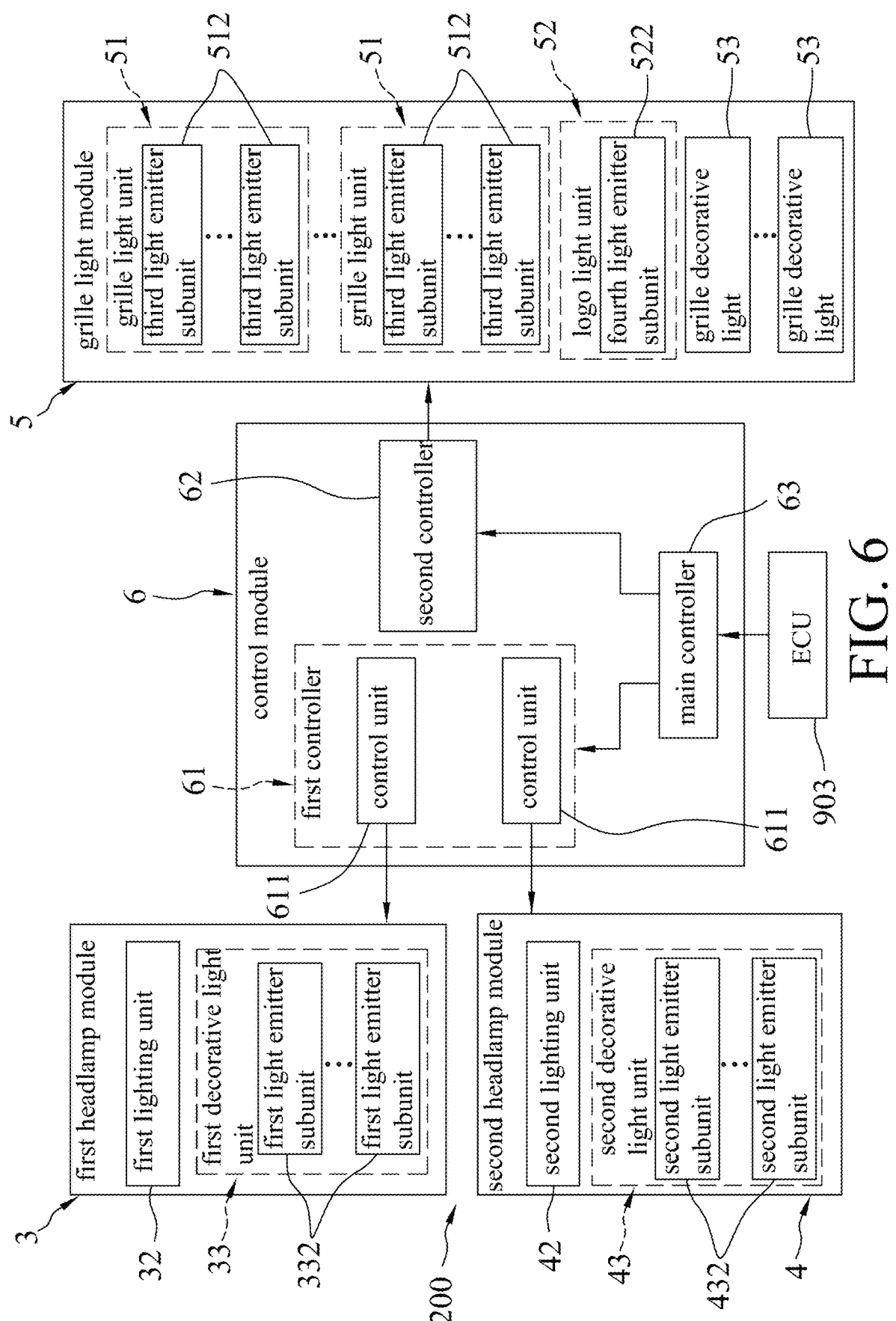
FIG. 6 is a block diagram illustrating the second embodiment.

Referring to FIGS. 5 and 6, a second embodiment of the dynamic vehicle headlamp system 200 is provided and differs from the first embodiment in the structural design of the grille light module 5. The following only illustrates the differences between the first and second embodiments for the sake of brevity.

In the second embodiment, the grille light module 5 further includes a plurality of grille decorative lights 53 that are disposed on the front side of the grille 902, that are spaced apart from each other and disposed between the grille light units 51, and that are configured to be controlled by the control module 6 to emit light. The grille decorative lights 53 are round shaped, but are not limited to such.

The second controller 62 is signally connected to the grille decorative lights 53 to control light emission timing thereof, such as time points at which the grille decorative lights 53 are turned on (i.e., start emitting light) and are turned off, time periods for which the grille decorative lights 53 switch from a turned-on state to a turned-off state and from the turned-off state to the turned-on state, etc., but is not limited to such.

The main controller 63 may be controlled by a light control signal of the ECU 903 to drive the first controller 61 to control the first decorative light units 33 and the second decorative light units 43 to emit light and to turn off, and to drive the second controller 62 to control the grille light units 51, the logo light unit 52 and the grille decorative lights 53 to emit light and to turn off, so that the first decorative light units 33, the second decorative light units 43, the grille light units 51, the logo light unit 52 and the grille decorative lights 53 are functioned cooperatively in the predetermined lighting mode, which generates the dynamic vehicle headlamp effect.

To sum up, through structural design of the first headlamp module 3, the second headlamp module 4 and the grille light module 5, and through the control module 6 being able to control the first headlamp module 3, the second headlamp module 4 and the grille light module 5 to function in the predetermined lighting mode, the generated dynamic vehicle headlamp effect may present on the entire front side area of the vehicle head 901 of the vehicle 900, which significantly enlarges an area where the dynamic vehicle headlamp effect presents and thus attracts consumers and the crowd more easily. Thus, the dynamic vehicle headlamp system 200 of the present disclosure is indeed an improvement and may achieve the object of the present disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A dynamic vehicle headlamp system adapted to be mounted to a vehicle head and a grille of a vehicle, and adapted to be signally connected to an electronic control unit (ECU) of the vehicle, said dynamic vehicle headlamp system comprising:

a first headlamp module and a second headlamp module adapted to be mounted to the vehicle head and spaced apart from each other in a left-right direction, said first headlamp module including a first decorative light unit, said second headlamp module including a second decorative light unit;

a grille light module including a grille light unit that is adapted to be disposed on the grille of the vehicle; and a control module signally connected to said first headlamp module, said second headlamp module and said grille light module, and adapted to be signally connected to the ECU, said control module being configured to be actuated by a light control signal transmitted from the ECU to control said first decorative light unit, said second decorative light unit and said grille light unit to function in a predetermined lighting mode;

wherein said first decorative light unit includes a first light strip that is elongated and light-transmissible, and a plurality of first light emitter subunits that are disposed in said first light strip, that are spaced apart from each other along an extending direction of said first light strip, and that are configured to be controlled by said control module to emit light;

wherein said second decorative light unit includes a second light strip that is elongated and light-transmissible, and a plurality of second light emitter subunits that are disposed in said second light strip, that are spaced apart from each other along an extending direction of said second light strip, and that are configured to be controlled by said control module to emit light;

wherein said grille light unit includes a grille light strip that is elongated and light-transmissible, and a plurality of grille light emitter subunits that are disposed in said grille light strip, that are spaced apart from each other along an extending direction of said grille light strip, and that are configured to be controlled by said control module to emit light; and wherein said grille light module further includes a logo light unit including a logo holder that is light transmissible, and a logo light emitter subunit that is disposed in said logo holder, said control module being configured to control said plurality of first light emitter subunits, said plurality of second light emitter subunits, said plurality of grille light emitter subunits and said logo light emitter subunit to function in the predetermined lighting mode based on the light control signal.

2. The dynamic vehicle headlamp system as claimed in claim 1, wherein said control module includes a first controller that is signally connected to said first headlamp module and said second headlamp module, a second controller that is signally connected to said grille light module, and a main controller that is signally connected to said first controller and said second controller and that is adapted to be signally connected to the ECU, said main controller being configured to be triggered by the light control signal transmitted from the ECU, to thereby drive said first controller to control light emission timing of said plurality of first light emitter subunits and said plurality of second light emitter subunits, and to thereby drive said second controller to control light emission timing of said plurality of grille light emitter subunits and said logo light emitter subunit.

3. The dynamic vehicle headlamp system as claimed in claim 2, wherein said first controller includes two control units that are respectively and signally connected to said first headlamp module and said second headlamp module, said main controller being configured to drive said control units to control the light emission timing of said plurality of first light emitter subunits and said plurality of second light emitter subunits.

4. The dynamic vehicle headlamp system as claimed in claim 1, wherein said grille light module further includes a plurality of grille decorative lights that are adapted to be disposed on a front side of the grille, that are spaced apart from each other, and that are configured to be controlled by said control module to emit light.

5. The dynamic vehicle headlamp system as claimed in claim 4, wherein said control module includes a first controller that is signally connected to said first headlamp module and said second headlamp module, a second controller that is signally connected to said grille light module, and a main controller that is signally connected to said first controller and said second controller and that is adapted to be signally connected to the ECU, said main controller being configured to be triggered by the light control signal transmitted from the ECU, to thereby drive said first controller to control light emission timing of said plurality of first light emitter subunits and said plurality of second light emitter subunits, and to thereby drive said second controller to control light emission timing of said plurality of grille light emitter subunits and said plurality of grille decorative lights.

6. The dynamic vehicle headlamp system as claimed in claim 5, wherein said first controller includes two control units that are respectively and signally connected to said first headlamp module and said second headlamp module, said main controller being configured to drive said control units to control the light emission timing of said plurality of first light emitter subunits and said plurality of second light emitter subunits.

7. The dynamic vehicle headlamp system as claimed in claim 1, wherein said first headlamp module further includes a first lighting unit, said second headlamp module further including a second lighting unit, said first lighting unit and said second lighting unit being configured to be controlled by said control module to emit light, thereby cooperatively forming a beam pattern of a high beam and/or a beam pattern of a low beam.

8. A dynamic vehicle headlamp system adapted to be mounted to a vehicle head and a grille of a vehicle, and adapted to be signally connected to an electronic control unit (ECU) of the vehicle, said dynamic vehicle headlamp system comprising:

a first headlamp module and a second headlamp module adapted to be mounted to the vehicle head and spaced apart from each other in a left-right direction, said first headlamp module including a first decorative light unit, said second headlamp module including a second decorative light unit;

a grille light module including a grille light unit that is adapted to be disposed on the grille of the vehicle; and a control module signally connected to said first headlamp module, said second headlamp module and said grille light module, and adapted to be signally connected to the ECU, said control module being configured to be actuated by a light control signal transmitted from the ECU to control said first decorative light unit, said second decorative light unit and said grille light unit to function in a predetermined lighting mode;

wherein said first decorative light unit includes a first light strip that is elongated and light-transmissible, and a plurality of first light emitter subunits that are disposed in said first light strip, that are spaced apart from each other along an extending direction of said first light strip, and that are configured to be controlled by said control module to emit light;

wherein said second decorative light unit includes a second light strip that is elongated and light-transmissible, and a plurality of second light emitter subunits that are disposed in said second light strip, that are spaced apart from each other along an extending direction of said second light strip, and that are configured to be controlled by said control module to emit light;

wherein said grille light unit includes a grille light strip that is elongated and light-transmissible, and a plurality of grille light emitter subunits that are disposed in said grille light strip, that are spaced apart from each other along an extending direction of said grille light strip, and that are configured to be controlled by said control module to emit light;

wherein said grille light module further includes a plurality of grille decorative lights that are adapted to be disposed on a front side of the grille, that are spaced apart from each other, and that are configured to be controlled by said control module to emit light; and wherein said control module includes a first controller that is signally connected to said first headlamp module and said second headlamp module, a second controller that is signally connected to said grille light module, and a main controller that is signally connected to said first controller and said second controller and that is adapted to be signally connected to the ECU, said main controller being configured to be triggered by the light control signal transmitted from the ECU, to thereby drive said first controller to control light emission timing of said plurality of first light emitter subunits and said plurality of second light emitter subunits, and to thereby drive said second controller to control light emission timing of said plurality of grille light emitter subunits and said plurality of grille decorative lights.

9. The dynamic vehicle headlamp system as claimed in claim 8, wherein said first controller includes two control units that are respectively and signally connected to said first headlamp module and said second headlamp module, said main controller being configured to drive said control units to control the light emission timing of said plurality of first light emitter subunits and said plurality of second light emitter subunits.

10. The dynamic vehicle headlamp system as claimed in claim 8, wherein said first headlamp module further includes a first lighting unit, said second headlamp module further including a second lighting unit, said first lighting unit and said second lighting unit being configured to be controlled by said control module to emit light, thereby cooperatively forming a beam pattern of a high beam and/or a beam pattern of a low beam.

* * * * *